United States Patent [19]
Siegl

[11] Patent Number: 6,047,683
[45] Date of Patent: Apr. 11, 2000

[54] PROCESS AND ARRANGEMENT FOR CONTROLLING THE FUEL INJECTION QUANTITY FOR AN INTERNAL-COMBUSTION ENGINE IN A VEHICLE

[75] Inventor: Norbert Siegl, Lenggries, Germany

[73] Assignee: Bayerische Motoren Werke Aktiengesellschaft, Munich, Germany

[21] Appl. No.: 09/135,488

[22] Filed: Aug. 18, 1998

[30] Foreign Application Priority Data

Aug. 18, 1997 [DE] Germany .......................... 197 35 721

[51] Int. Cl.⁷ ...................................... F02D 41/30
[52] U.S. Cl. ........................ 123/480; 123/478; 123/490
[58] Field of Search ................................. 123/436, 478, 123/480, 490; 701/103, 104, 105

[56] References Cited

U.S. PATENT DOCUMENTS 4,355,614  10/1982  Hayashi et al. ........................ 123/436
5,732,381   3/1998  Guido et al. ....................... 123/480 X

FOREIGN PATENT DOCUMENTS 41 13 958  11/1992  Germany .
44 20 956  12/1995  Germany .

*Primary Examiner*—Tony M. Argenbright
*Attorney, Agent, or Firm*—Evenson, McKeown, Edwards & Lenahan, PLLC

[57] ABSTRACT

In a process for controlling the fuel injection quantity for an internal-combustion engine in a vehicle via an electronic control unit, the actual angle of the crankshaft is detected and, as a function of the actual angle, of a defined fuel injection time and of a defined injection end angle, the required fuel injection starting angle of the crankshaft or the required injection starting point in time for a certain cylinder is determined. The injection is carried out in a time-controlled manner by triggering an injection valve, which is assigned to the certain cylinder, for the defined fuel injection time to an actual injection end angle. Furthermore, while maintaining the defined injection end angle, a short pulse is defined in the control unit as an additional fuel injection time for the certain cylinder if the actual injection end angle is before the defined injection end angle.

6 Claims, 1 Drawing Sheet

PROCESS AND ARRANGEMENT FOR CONTROLLING THE FUEL INJECTION QUANTITY FOR AN INTERNAL-COMBUSTION ENGINE IN A VEHICLE

BACKGROUND AND SUMMARY OF THE INVENTION

This application claims the priority of German Patent Application No. 197 35 721.0, filed Aug. 18, 1997, the disclosure of which is expressly incorporated by reference herein.

The invention relates to a process and an arrangement for controlling the fuel injection quantity for an internal-combustion engine in a vehicle.

Such a process and such an arrangement are known, for example, from the current four-cylinder internal-combustion engines in BMW vehicles. These BMW vehicles have an electronic internal-combustion engine control unit with a Motorola processor arrangement (such as a 68333 or 68336) which contains two different, mutually communicating processors (CPU (central processing unit), TPU (time processing unit)). As the first processor of this processor arrangement, the CPU carries out, in particular, computing-time-intensive functions, whereas, the TPU, as the second processor of this processor arrangement, carries out real-time-critical functions, in particular, crankshaft-synchronous control functions. Both processors may be equipped wits application-specific software programs.

For controlling the fuel injection quantity, which is carried out preferably in a cylinder-selective or sequential manner, the CPU transmits a defined fuel injection time and a defined injection end angle of the crankshaft in each case for a certain cylinder to the TPU. The TPU detects the actual angle of the crankshaft. As a function of the actual angle of the crankshaft, of the defined fuel injection time and of the defined injection end angle, the TPU determines the injection starting angle of the crankshaft required for this purpose or the required injection starting point in time. If the determined starting point in time has been reached or the actual angle corresponds to the determined required injection starting angle, the TPU carries out the injection in a time-controlled manner by triggering the injection valve, which is assigned to a certain cylinder, for the defined fuel injection time without further taking into account the actual angle of the crankshaft.

In this known process, the actual injection end angle after the emission of the defined fuel injection time usually corresponds with a very high precision to the defined injection end angle if the angular crankshaft speed or the rotational speed of the internal-combustion engine remains constant during the injection. If, however, particularly in the case of starting operations, there are strong rotational speed fluctuations, then the actual injection end angle will frequently deviate considerably from the defined injection end angle. If, in the case of the known process, the rotational speed is increased for a short time during the injection, the deviation of the actual injection end angle from the defined injection end angle is ignored because, in this case, the defined injection end angle is situated before the actual injection end angle. However, if, during the injection for the defined fuel injection time, there is a slowing of the rotational speed, then the actual injection end angle is before the defined injection end angle. In the case of the known process, the injection is started here again for the already previously defined fuel injection time if, after a defined waiting time, the defined injection end angle has not yet been reached. In the event of rotational speed fluctuations, this approach frequently results in unnecessary double injections.

It is therefore an object of the present invention to improve upon a process of the above-mentioned type such that unnecessary double injections and therefore an unnecessary fuel consumption are avoided.

This object is achieved by a process for controlling the fuel injection quantity for an internal-combustion engine in a vehicle by means of an electronic control unit in which the actual angle (KW_actual) of the crankshaft is detected. As a function of the actual angle (KW_actual), of a defined fuel injection time (ti; t_real) and of a defined injection end angle KW_des), the required injection starting angle (KW_start) of the crankshaft or the required injection starting point in time (tiS) for a certain cylinder is determined. The injection is carried out in a time-controlled manner by triggering the injection valve (EV), which is assigned to the certain cylinder, for the defined fuel injection time (ti) to an actual injection end angle (KW_end) In the control unit, while maintaining the defined injection end angle (KW_des; 15), a short pulse t_short) is defined as the additional injection time (ti) for the certain cylinder if the actual injection end angle (KW_end; 9) is before the defined injection end angle (KW_des; 15).

An arrangement for achieving this object in an internal-combustion engine in a vehicle with an electronic control unit has two mutually communicating processors (TPU, CPU), in which, for a certain cylinder, a first processor (CPU) transmits a defined fuel injection time (ti; t_real) and a defined injection end angle (KW_des) of the crankshaft to the second processor (TPU). The second processor (TPU) detects the actual angle (KW actual) of the crankshaft. The second processor (TPU), as a function of the actual angle (KW_actual), of the defined fuel injection time (ti) and of the defined injection end angle (KW des), determines the required injection starting angle (KW_start) of the crankshaft or the required injection starting point in time (tiS). When the injection starting angle (KW_actual=KW start) is reached, the injection is carried out in a time-controlled manner by triggering the injection valve (EV), which is assigned to the certain cylinder, for the defined fuel injection time (ti). The second processor (TPU) transmits the actual injection end angle (KW_end; 9) or the injection end point in time (tiE) and the actual angle (KW_actual) to the first processor (CPU). The first processor (CPU) compares the defined injection end angle (KW_des; 15) and the actual injection end angle (KW_end; 9) with one another. If the defined injection end angle (KW_des; 15) is after the actual injection end angle (KW end; 9), the first processor (CPU) defines to the second processor (TPU), while maintaining the previously defined injection end angle (KW_des; 15), a short pulse t_short) as the additional fuel injection time (ti).

The defining of an additional short pulse as an additional fuel injection time while maintaining the previously defined injection end angle if the actual injection end angle at the end of the injection for the previously defined fuel injection time is before the defined injection end angle is essential for the present invention. When a short pulse is defined, the approach is conventionally such that, as a function of the actual angle of the crankshaft, of the defined fuel injection time—here, in the form of the short pulse—, and of the defined injection end angle, the required injection starting angle of the crankshaft or the required injection starting point in time is determined again. In this case, the length of the short pulse is determined such that no rotational speed change can occur or be detected during the time of the short pulse. Thus, it is ensured that, at the end of the fuel injection time in the form of the short pulse, the actual injection end angle is necessarily equal to the defined injection end angle.

According to an advantageous further development of the invention, the injection valves are switched off at least for the duration of the short pulse so that a fuel injection time in the form of the short pulse is only virtually defined in the control unit without in fact triggering a superfluous fuel injection.

Thus, on the basis of the known process and the known arrangement, using the process according to the present invention and using the arrangement according to the present invention, a reliable rotational speed synchronization is carried out without causing a superfluous fuel consumption.

Other objects, advantages and novel features of the present invention will become apparent from the following detailed description of the invention when considered in conjunction with the accompanying drawings.

DETAILED DESCRIPTION OF THE DRAWINGS

Figure 1:
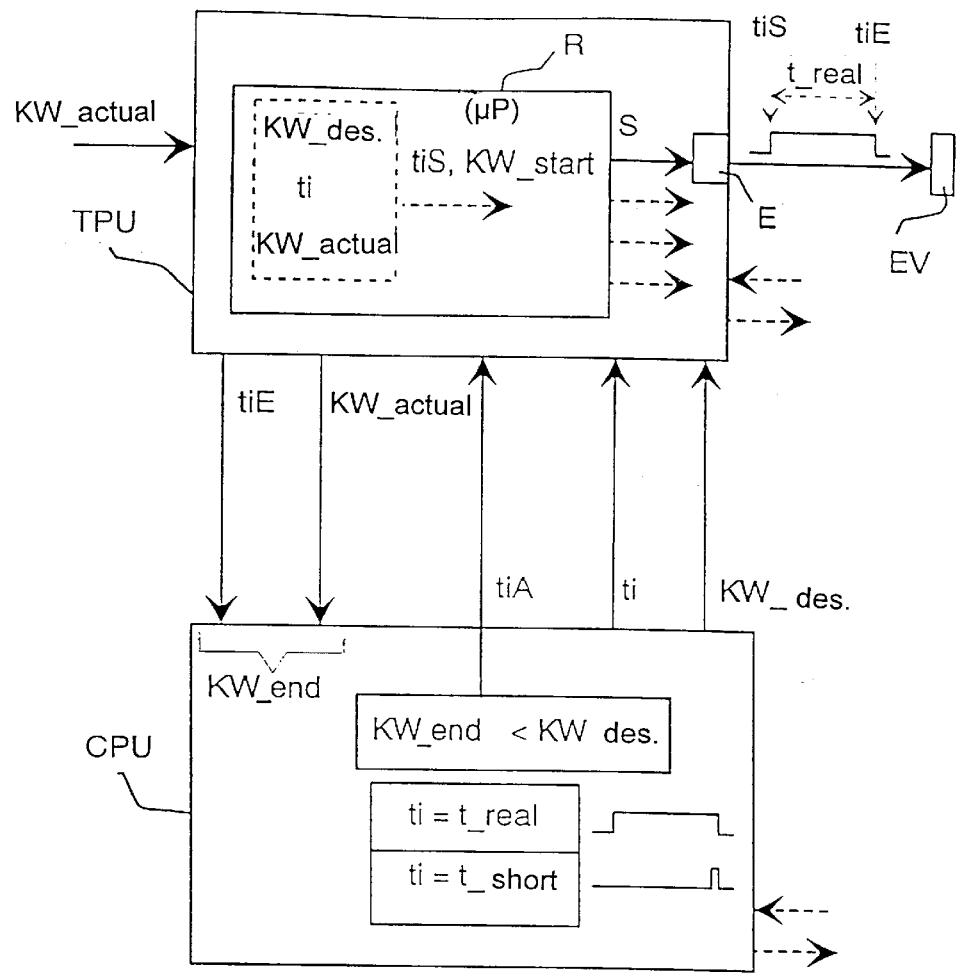
FIG. 1 is a block diagram of the essential components of the arrangement according to the present invention.

FIG. 1 illustrates the mutually communicating processors—the first processor CPU and the second processor TPU—which are contained in a control unit (which is not shown here completely). On the basis of input signals (not described here in detail), the first processor CPU determines in a known manner the real fuel injection time ti=t_real to be defined for each cylinder of an internal-combustion engine, as well as an injection end angle KW des of the crankshaft to be defined and transmits these two data to the second processor TPU. In a known manner, the second processor TPU determines the actual angle KW_actual of the crankshaft, preferably by means of an inductive rotational speed sensor mounted on the crankshaft. The rotational speed sensor scans a ferromagnetic generator gear mounted on the crankshaft and having a plurality of teeth which includes a larger tooth space (reference mark).

In a supplementary fashion, with respect to the method of operation of the rotational speed sensor, reference is made to the technical manual "The Autoelectric System, the Autoelectronic System on the Otto Engine", Bosch, VDI Publishers, 1994, Pages 224 and 225. Concerning the conventional calculation of a fuel injection time to be defined, particularly in the case of a sequential injection, in the manner of an example, reference is also made to the same technical manual, Pages 231 and Page 232, the above-described pages of the manual being incorporated herein as non-essential matter.

In a computing unit R, the second processor TPU determines the injection starting angle KW_start of the crankshaft required for these definitions or the required injection starting point in time tiS as a function of the actual angle KW-actual of the crankshaft, of the defined fuel injection time ti=t_real and of the defined injection end angle $KW_{13}$ des, When the injection starting angle KW_actual=$KW_{13}$ start is reached at the injection starting point in time tiS, the computing unit R transmits in a time-controlled manner the injection for a particular cylinder by triggering the injection valve EV, which is assigned to the particular cylinder, for the defined fuel injection time ti=t real. For this purpose, the computing unit R emits a control signal S to the end stage E for triggering the injection valve EV. During the defined fuel injection time ti=t__real, the computing unit R ignores the actual angle KW_actual of the crankshaft. Therefore, only a time control takes place and no regulating as a function of the crankshaft angle occurs.

After the expiration of the defined fuel injection time ti=$t_{13}$ real, that is, at the injection end point in time tiE, this injection end point in time tiE as well as the actual angle KW actual of the crankshaft which exists at this point in time is transmitted to the first processor CPU. The actual angle KW_actual of the crankshaft at the injection end point in time tiE corresponds to the actual injection end angle KW_end. The first processor CPU compares the actual injection end angle KW_end with the defined injection end angle KW_des. If the actual injection end angle KW_end (9; see FIG. 2) is before the defined injection end angle KW_des (15; see FIG. 2), then the first processor CPU will emit a control signal tiA to the second processor TPU for switching off the injection valve EV. Thus, by way of the control signal S, the computing unit R of the second processor TPU triggers the end stage E such that no fuel can be delivered by way of the injection valve EV.

Simultaneously, the first processor CPU defines to the second processor TPU, while maintaining the previously defined injection end angle KW_des 15, a short pulse ti–$t_{13}$ short as the new fuel injection time ti. As customary, the computing unit R determines the required injection starting angle KW_start of the crankshaft as a function of the actual angle KW_actual, of the new defined fuel injection time ti=t_short and of the defined injection end angle KW_des. Then, inside the processor within the computing unit R, a virtual injection is defined for the fuel injection time $t_{13}$ short in the form of a short pulse which, however, has no real effect because of the switching-off of the injection valve EV. At the end of the fuel injection time in the form of the short pulse t_short, the second processor TPU again transmits the injection end point in time tiE and the actual angle KW_actual of the crankshaft existing at this point in time to the first processor CPU. Since the short pulse has such a length (see FIG. 2) that, within the fuel injection time in the form of the short pulse, no rotational speed change and no change of the angular crankshaft speed can take place, it is determined in the first processor CPU that now the actual injection end angle KW_end is equal to the already previously defined injection end angle KW_des (15). Thus, a successful synchronization was carried out in the case of a rotational speed fluctuation.

Figure 2:
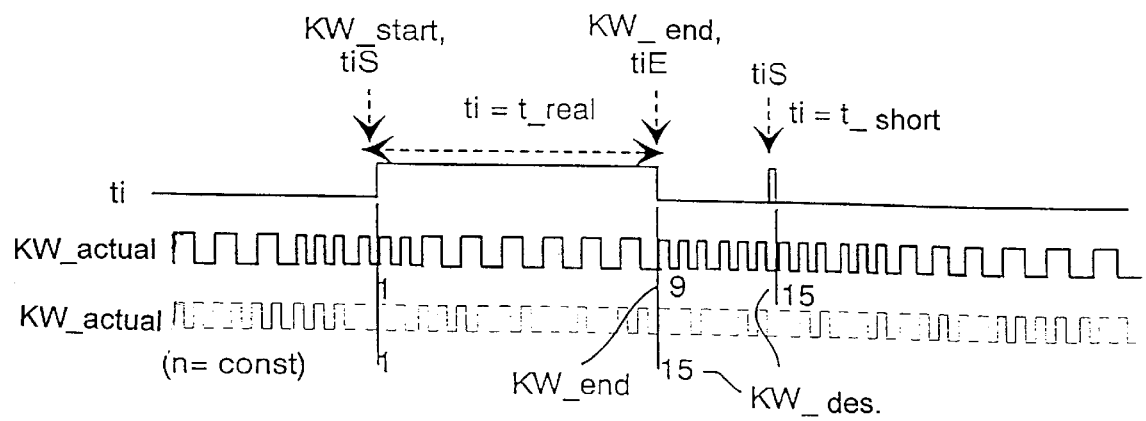
FIG. 2 is a timing diagram of the defined real fuel injection time and the subsequent fuel injection time in the form of the short pulse if, at the end of the real fuel injection time, the actual injection end angle is before the defined injection end angle.

FIG. 2 illustrates the time sequence of the defined real fuel injection time ti=t_real and of the additional virtual fuel injection time ti=t_short for the case of a rotational speed slow-down during the defined real fuel injection time t=t_ real. Furthermore, FIG. 2 also shows two sensor signals indicating the rotational speed for detecting the actual angle KW_actual; on the bottom for a constant rotational speed n and in the center for the case where the rotational speed fluctuates. The pulses of the sensor signals correspond to the teeth of the generator gear connected with the crankshaft. In principle, the actual angle KW_actual of the crankshaft is determined by the number of the tooth behind the tooth gap (reference mark - which is not shown here).

For simplifying the illustration of the invention, the determined required injection starting angle KW_start has the reference number 1 in FIG. 2. This required injection starting angle KW_start was determined by the second processor TPU as a function of the defined injection end angle KW_des=15 and as a function of the defined fuel injection time ti=t_real. The second processor TPU bases this determination on maintaining the rotational speed which exists shortly before the injection starting point in time tiS, as illustrated in FIG. 2 by the lower rotational speed sensor signal. However, if, as illustrated in FIG. 2 by the upper rotational speed sensor signal, the rotational speed changes during the fuel injection time ti=t_real in the form of a slowing-down of the rotational speed, then the actual injection end angle KW_end at the injection end point in time tiE will be at 9. Thus, the actual injection end angle KW_end is before the previously defined injection end angle KW_des=15. In this case, the second processor TPU, within the processor R, emits, as a function of the previously already defined injection end angle KW_des and of the additional fuel injection time ti in the form of the short pulse t t_short at a new injection starting point in time ti, this short pulse such that subsequently the new actual injection end angle KW_end is the same as the defined injection end angle KW_des. The length of the short pulse is preferably shorter than the pulse width of the rotational sensor signal. Thus, during the fuel injection time in the form of the short pulse t_short, the rotational speed cannot change, whereby it is ensured that the new actual injection end angle KW_end is equal to the defined injection end angle KW_des=15.

By means of this arrangement according to the invention and this process according to the invention, a rotational speed synchronization is achieved and the system-caused double injections, as initially described, are effectively avoided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for controlling a fuel injection quantity for an internal-combustion engine in a vehicle using an electronic control unit in which an actual crankshaft angle is detected, the process comprising the acts of:

determining a required injection starting angle of a crankshaft or a required injection starting point in time for a particular cylinder as a function of the actual crankshaft angle, a defined fuel injection time and a defined crankshaft end angle;

triggering an injection valve, assigned to the particular cylinder, for the defined fuel injection time until an actual crankshaft injection end angle to carry out fuel injection in a time-controlled manner; and while maintaining the defined crankshaft injection end angle, defining in the control unit a short pulse as an additional injection time for the particular cylinder if the actual crankshaft injection end angle is before the defined crankshaft injection end angle.

2. The process according to claim 1, further comprising the act of switching-off the injection valve assigned to the particular cylinder when the short pulse is defined as the additional injection time for the particular cylinder.

3. An arrangement for performing a process for controlling a fuel injection quantity for an internal-combustion engine in a vehicle, the arrangement comprising:

an electronic control unit having two processors coupled with one another, wherein in the electronic control unit, for a particular cylinder, a first processor transmits a defined fuel injection time and a defined crankshaft injection end angle of the crankshaft, and a second processor receives the transmitted defined fuel injection time and the defined crankshaft injection end angle, and detects an actual crankshaft angle of the crankshaft;

wherein the second processor, as a function of the actual crankshaft angle, of the defined fuel injection time and of the defined crankshaft injection end angle, determines a required injection starting angle of the crankshaft or a required injection starting point -n time and, when the required injection starting angle equals the actual crankshaft angle, an injection is carried out in a tire-controlled manner by triggering an injection valve assigned to the particular cylinder for the defined fuel injection time;

wherein the second processor transmits an actual injection end angle or an injection end point in time and the actual crankshaft angle to the first processor;

wherein the first processor compares the defined injection end angle and the actual crankshaft injection end angle with one another, and if the defined injection end angle is after the actual crankshaft injection end angle, the first processor defines to the second processor, while maintaining the previously defined crankshaft injection end angle, a short pulse as an additional fuel injection time.

4. The arrangement according to claim 3, further wherein the first processor transmits to the second processor a control signal for switching off the injection valve assigned to the particular cylinder when the short pulse is defined as the additional fuel injection time.

5. A software product for controlling a fuel injection quantity for an internal-combustion engine in a vehicle having an electronic control unit, comprising a computer readable medium having stored thereon program code segments that:

determine a required injection starting angle of a crankshaft or a required injection starting point in time for a particular cylinder as a function of the actual crankshaft angle, a defined fuel injection time and a defined crankshaft end angle;

trigger an injection valve, assigned to the particular cylinder, for the defined fuel injection time until an actual crankshaft injection end angle to carry out fuel injection in a time-controlled manner; and while maintaining the defined crankshaft injection end angle, define in the control unit a short pulse as an additional injection time for the particular cylinder if the actual crankshaft injection end angle is before the defined crankshaft injection end angle.

6. The software product according to claim 5, wherein the computer readable medium has further stored thereon a program code segment that comprises the act of switching-off the injection valve assigned to the particular cylinder when the short pulse is defined as the additional injection time for the particular cylinder.

* * * * *